United States Patent
Chlapecka et al.

(10) Patent No.: US 8,297,692 B2
(45) Date of Patent: Oct. 30, 2012

(54) TILTABLE SUN ROOF FOR VEHICLES

(75) Inventors: Stefan Chlapecka, West Bloomfield, MI (US); Nobuhiro Mizoguchi, Northville, MI (US); Yoji Nagashima, West Bloomfield, MI (US)

(73) Assignee: Aisin Technical Center of America, Inc., Plymouth, MI (US)

( * ) Notice: Subject to any disclaimer, the term of this patent is extended or adjusted under 35 U.S.C. 154(b) by 399 days.

(21) Appl. No.: 12/622,640

(22) Filed: Nov. 20, 2009

(65) Prior Publication Data

US 2011/0121616 A1 May 26, 2011

(51) Int. Cl.
*B60J 7/05* (2006.01)
(52) U.S. Cl. .................................. 296/216.02; 296/221
(58) Field of Classification Search ...... 296/216.01–224
See application file for complete search history.

(56) References Cited

U.S. PATENT DOCUMENTS

| | | | | |
|---|---|---|---|---|
| 4,226,052 | A * | 10/1980 | DeStepheno | 49/465 |
| 5,484,185 | A | 1/1996 | Salz et al. | |
| 6,390,545 | B1 | 5/2002 | Makino et al. | |
| 6,817,658 | B2 | 11/2004 | Ohnishi et al. | |
| 7,753,438 | B2 * | 7/2010 | Manders et al. | 296/221 |
| 2008/0303316 | A1 | 12/2008 | Mooney | |
| 2009/0072588 | A1 | 3/2009 | Nakamura | |

FOREIGN PATENT DOCUMENTS

| | | |
|---|---|---|
| DE | 44 07 286 C1 | 5/1995 |
| DE | 102 17 659 A1 | 11/2003 |
| EP | 1 070 616 A1 | 2/2001 |
| EP | 1 095 807 A1 | 5/2001 |
| EP | 1 798 086 A2 | 6/2007 |

OTHER PUBLICATIONS

International Search Report dated Feb. 22, 2011 issued in International Application No. PCT/US2010/003002.

* cited by examiner

*Primary Examiner* — Dennis Pedder
(74) *Attorney, Agent, or Firm* — Buchanan Ingersoll & Rooney PC

(57) ABSTRACT

A vehicle sun roof device includes a panel for covering an opening in a roof of the vehicle. The panel can be moved horizontally to uncover the opening or tilted to raise its rear end section to a venting position. A drive system for tilting the panel includes front and rear shoes. The rear shoe tilts the panel by applying a force to the rear end section of the panel. The front shoe includes an upwardly facing support surface and a downwardly facing support surface. A bracket fixed to the panel and extending in the front-to-rear direction of the vehicle includes an upwardly facing bearing surface and a downwardly facing bearing surface arranged to slidably engage the downwardly facing support surface and the upwardly facing support surface, respectively, of the front shoe. The support surfaces and the bearing surfaces are configured to define a virtual pivot axis for the panel as the panel tilts.

10 Claims, 5 Drawing Sheets

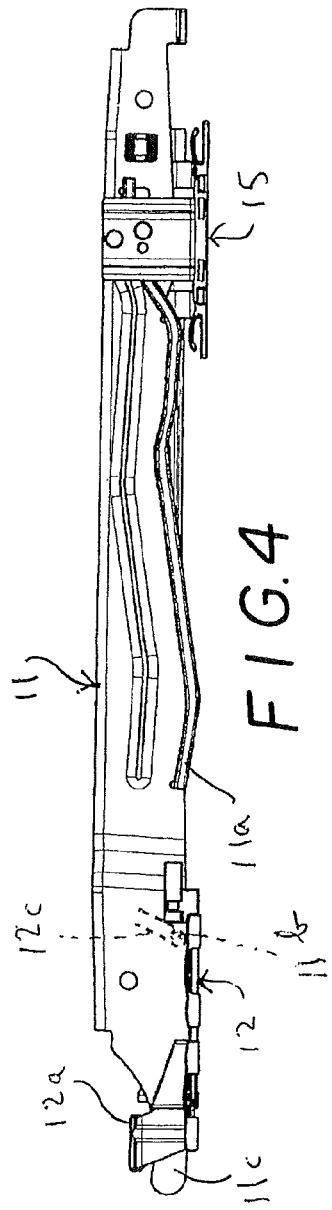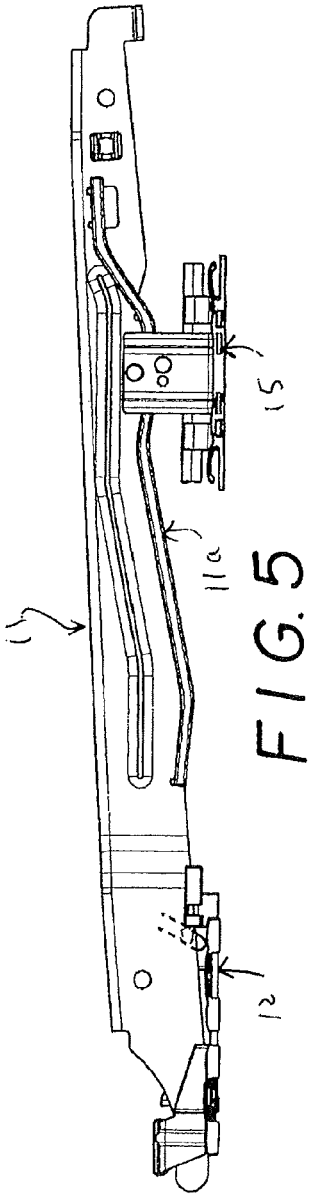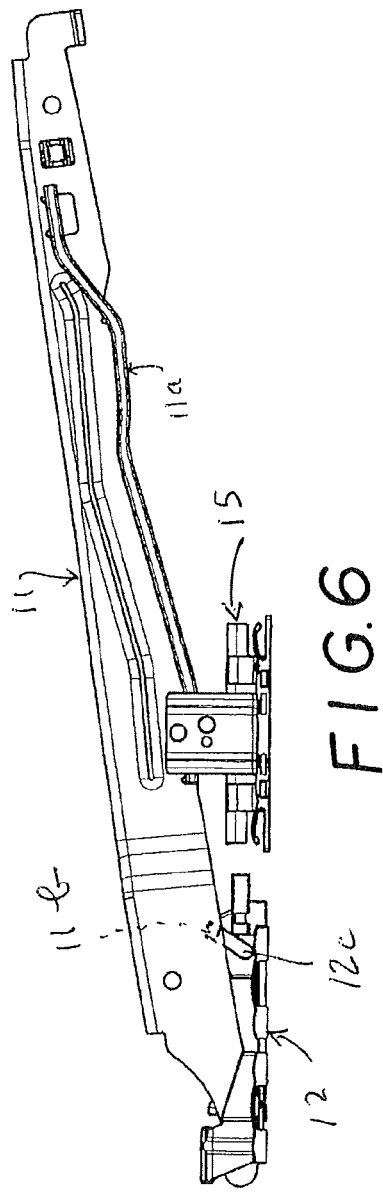

TILTABLE SUN ROOF FOR VEHICLES

BACKGROUND

This invention relates to sun roofs for vehicles.

Vehicle sun roofs may comprise a plurality of relatively small movable closure panels as disclosed in U.S. Pat. No. 5,484,185 in which the panels are arranged side by side in a flat manner to cover the roof panel opening. To uncover the roof opening, beginning with the rearmost panel, each panel tilts its rear edge upward which is then unlocked from the panel ahead of it and moves rearward, until all panels have reached their most rearward position. When all panels have reached their final position, the panels are stacked parallel to each other, at an angled position mostly above the roof opening. Each panel is pivoted about a virtual axis positioned at a height above the roof panel opening. Since the panels lie next to each other and the clearance between panels should be minimized for visual purposes, this arrangement of the pivoting axes is necessary to avoid downward and forward movement of the front edge of the pivoting panel, to prevent a collision between the front edge of the currently pivoting panel and the panel forward of it, and the supporting components below it. With the pivoting axes located directly above the front edge of the panel, any forward and downward movement of the front edge during rotation can be eliminated.

Although the rotation axis is located above the front edge of the closure panel, the bearing structure has many shortcomings. The bearing structure of the pivot bearing and pivot bearing segment shape has a relatively large longitudinal dimension and is placed well in front of the panel edge. Since each panel is not always supported at its rear edge, the bearing segment must be large to support the weight of the panel. In the case of a multipanel roof, this can be acceptable due to the fact that there is an open space beneath the panel in front of the pivoting panel. In the case of a conventional single-panel sunroof, the space in front of the panel is typically occupied by many components such as the roof panel downward sealing flange, the stowed air deflector, the front frame and A-pillar drain holes/pipes, and cable guide pipes if the sunroof is driven from the front of the vehicle. Typically, there would not be any vertical support upon which the pivot bearing could rest. The functioning components typically need to be located within the outline of the movable panel for fitment of a conventional single-panel sunroof.

Many vehicle manufacturers have a strength requirement for an upward force pushing at the center of the closure panel, which would be then partially routed to the bearing structure. In this device, the pivot bearing shape is such that it would either need to be manufactured by a high performance resin injection or cast metal. In either case, an additional premium cost would be necessary over a general resin injection or stamped metal part, or combination of a stamping and injection part.

Furthermore, under the teachings of the prior art, the system can be simplified by component consolidation. In particular, the assembly of the plate carrier, the pivot bearing segment, and guide pin can be consolidated into one component for a conventional sunroof system.

A sunroof disclosed in U.S. Pat. No. 6,390,545 slides horizontally from a closed position in which it covers a vehicle roof panel opening, to a lowered uncovering position within a cavity disposed under the vehicle roof panel and above a vehicle headliner. In the closed covering position, the sunroof glass panel is able to rotate upwardly from the closed position to a pair of tilted positions for ventilation, and back down to the closed position to enable the panel to be slid to the lowered uncovering position. This sunroof's rotation producing components include a bracket, a driven shoe, a pivot pin, and a guide block for effecting sunroof rotation through the lowered, closed, and tilted positions. A joining process is needed to attach the pin to the bracket and the driven shoe and this pin becomes a rotation axis for the sunroof system. The guide block is typically fixed to a guide rail by a fastener or interference fit, which includes an open slot that will engage a fixed pin on the bracket. During operation, the bracket pin engages the guide block slot only in the lowered (uncovering), closed, and tilted positions. The force of a push/pull cable is transmitted through the bracket, the bracket pin, and the fixed guide block which allows rotation of the bracket and therefore the glass panel through the lowered, closed and tilted positions.

When the sunroof tilting rotation axis of the mechanism disclosed in U.S. Pat. No. 6,390,545 is positioned at a plane well below the roof panel opening, the radius length of the front and rear panel seal loci allows for a significant fore/aft component of movement, in relation to the roof panel opening. When a fixed guide block is used, there is also a fore/aft movement of the sunroof panel rotation axis with the movable front guide between the lowered, closed, and tilted positions that can be relatively large, particularly between the closed and lowered positions. This fore/aft movement can result in overcompression in the sunroof panel seal during sunroof rotation. Such overcompression may result in undesirable noises, such as a rubbing noise, or thumping noise when the friction of the overcompressed seal is overcome, and exits the roof panel opening when rotating from the closed position to the lowered position. The prior art shows a method to reduce this overcompression by raising the pivoting axis above the stationary guide rail. However, this type of countermeasure requires additional processes to create a pivoting axis by a joining pin or other bearing surface, and its height is therefore limited to the shape of the sunroof components, and the packaging space available around the bearing area.

A sunroof device disclosed in U.S. Pat. No. 6,817,658 slides from a closed covering position within a vehicle roof panel opening to a lowered, uncovering position that is located in a cavity under a vehicle roof panel and above a vehicle headliner. From the closed covering position, the sunroof glass panel is able to rotate upwardly to a tilted position for ventilation, or slide down to a lowered position for uncovering the roofs opening. This sunroof's rotation-producing components include a side plate, a front guide, and pivot pin. A joining process is needed to attach the pin to a side plate and a front guide and this pin becomes a rotation axis for the sunroof system. In this system, the front guide is fixed during rotation due to a locking feature. The system is locked while in the lowered (uncovering), closed and tilted positions. The force of a push/pull cable is transmitted through the side plate and fixed front guide which then allows rotation of the bracket and therefore the glass panel through the lowered, closed and tilted positions. As mentioned previously, when the sunroof's tilting rotation axis is positioned at a plane well below the roof panel opening, the radius length of the front and rear panel seal loci allows for a significant fore/aft component of movement, in relation to the roof panel opening.

U.S. Pat. No. 6,817,658 also discloses a method to reduce this overcompression by raising the pivoting axis above the stationary guide rail. However as mentioned above in connection with U.S. Pat. No. 6,390,545, this type of countermeasure requires additional processes to created a pivoting axis by a joining pin or other bearing surface, and it's height is therefore limited to the shape of the sunroof's components, and the packaging space available around the bearing area.

Due to the nature of the fixed front guide during rotation of this sunroof device, the fore/aft movement of the sunroof rotation axis is eliminated.

SUMMARY

A vehicle sun roof device comprises a panel for covering an opening in a roof of the vehicle. The panel includes front and rear end sections, and is tiltable to raise the rear end section from a closed position to at least one venting position, and a drive system for tilting the panel. The drive system comprises a force-applying mechanism for tilting the panel by selectively applying an upward force or a downward force to the rear end section of the panel to raise or lower, respectively, the rear end section relative to the front end section. A support is disposed on the roof adjacent the front end section of the bracket and includes an upwardly facing support surface and a downwardly facing support surface. A bracket is fixed to the panel and extends in the front-to-rear direction of the vehicle. The bracket includes an upwardly facing bearing surface and a downwardly facing bearing surface arranged to slidably engage the downwardly facing support surface and the upwardly facing support surface, respectively, for defining a virtual pivot axis for the panel as the panel tilts.

That arrangement allows the sunroof panel to rotate about a virtual axis without the need for physical fasteners, or joining process. Since the arrangement does not include a physical fastener or joint, and thus is not limited by a fastener or joint hole in the bracket or guide shoe, the virtual axis can be spaced, both longitudinally and vertically, from the actual contacting bracket and guide shoe. The axis can be positioned at a location so that the rotation locus of the closure panel and seal is optimized to prevent seal overcompression during rotation between the closed and tilted position. Thus, unwanted noises due to the seal and roof panel opening are eliminated.

In another feature, the force applying mechanism includes a movable shoe which always supports a rear portion of the bracket, so the front support structure does not need to be as robust as shown in U.S. Pat. No. 5,484,185. The bearing surfaces can then be offset and moved within the outline of the movable panel. The longitudinal and vertical space occupied by the offset bearing surfaces is reduced, thus reducing the size of the sunroof and therefore increasing the volume of the vehicle's interior space. Additionally, this device allows for component integration/reduction, and applies a low cost steel/resin combination due the shape and arrangement of the bracket and guide shoe.

BRIEF DESCRIPTION OF DRAWINGS

FIG. 4 shows a side view of the driving mechanism of FIG. 2 in the closed covering position of the panel.

FIG. 5 shows a side view of the driving mechanism of FIG. 2 in a partially tilted position of the panel.

FIG. 6 shows a side view of the driving mechanism of FIG. 2 in a fully tilted position of the panel.

DETAILED DESCRIPTION OF A PREFERRED EMBODIMENT

Figure 1:
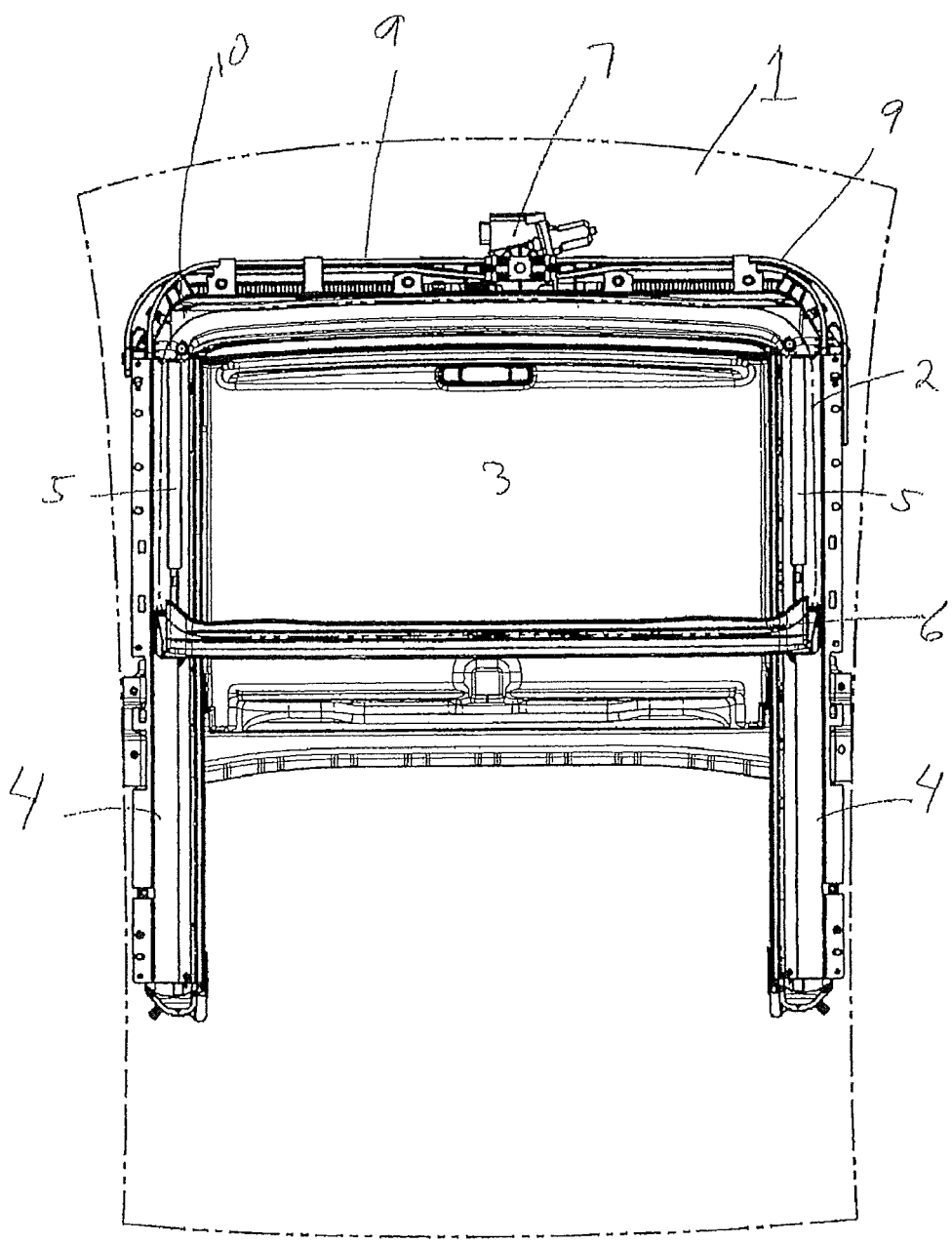
FIG. 1 shows a top plan view of a vehicle installed with a vehicle sunroof device according to the present invention.

FIG. 1 is a top view showing a vehicle sunroof system and driving mechanism embodying the invention. The system includes a closure panel 3 movable substantially horizontally in a front-to-rear direction of the vehicle for covering and uncovering an opening 2 formed in the vehicle roof. A pair of longitudinal guide rails 4 with integral drip channels are disposed along respective sides of the opening 2 in the fore/aft direction for supporting the movable closure panel 3, and a movable laterally extending rain channel 6 is affixed to the rear edge of the closure panel 3. A driving mechanism 5 is attached to a push/pull cable 8 for sliding the panel 3 substantially horizontally between the covering and uncovering positions, and for tilting the rear end of the panel up from a closed covering position to a tilted covering position, in order to promote ventilation, as will be explained.

A front frame 10 including an integral drip channel is perpendicularly connected to the guide rails 4 and extends along the fore edge of the closure panel 3. An actuating device 7 is attached to the front frame 10 and is engaged with the driving mechanism 5 via the push/pull cable 8. The push/pull cable 8 is guided through the front frame 10 by attached guide pipes 9 and through the guide rails 4.

With the panel 3 in the closed covering position, the actuating device 7 can be driven in either of first and second directions to slide the panel 3 rearwardly to uncover the opening 2 of the fixed roof 1, or tilt the rear end of the panel upwardly to a vented position above the opening 2.

Details of the driving mechanism 5 are shown in FIGS. 2-6. For simplicity, only the right hand side of the sunroof is shown. The left hand side is assumed to be a mirror image of the side shown. The driving mechanism 5 slides longitudinally and is supported vertically and laterally by the guide rails 4. The driving mechanism 5 includes a bracket 11, a driven shoe 12, and a drive shoe 15. The bracket 11 extends in the front-to-rear direction of the vehicle and is connected to one side of the movable closure panel 3 by conventional fasteners. Bracket 11 features a guiding fin 11a extending along its front-to-rear length, and a lateral guiding pin 11b. Along its length, the guiding fin 11a includes three vertically spaced upper, intermediate and lower sections 11a', 11a" and 11a''', with the upper section 11a' disposed closest to the rear end of the bracket 11. The bracket also includes a forwardly projecting arm 11c having an upwardly facing, cylindrically concavely curved bearing surface 11c' and a downwardly facing, cylindrically convexly curved support surface 11c" (see FIGS. 7-9). The arm 11c is disposed between upwardly and downwardly facing convexly curved support surfaces of two support elements 12a, 12b of the driven shoe 12. The driven shoe also includes a curved slot 12c in which the guiding pin 11b of the bracket is slidably movable (see FIGS. 4-6). The engagement between the support elements 12a, 12b and the arm 11c on the one hand, and between the pin 11b and the slot 12c on the other hand, guides the pivoting movement of the bracket 11, as will be explained.

The rear portion of the bracket 11 is supported by the drive shoe 15, with the fin 11a slidingly supported between upper and lower bearing pins 15a, 15b carried by the drive shoe 15.

The drive shoe 15 is connected to the cable 8, so the longitudinal positions of the drive shoe 15 and the bracket 11 are regulated by push/pull cable 8.

Figure 7:
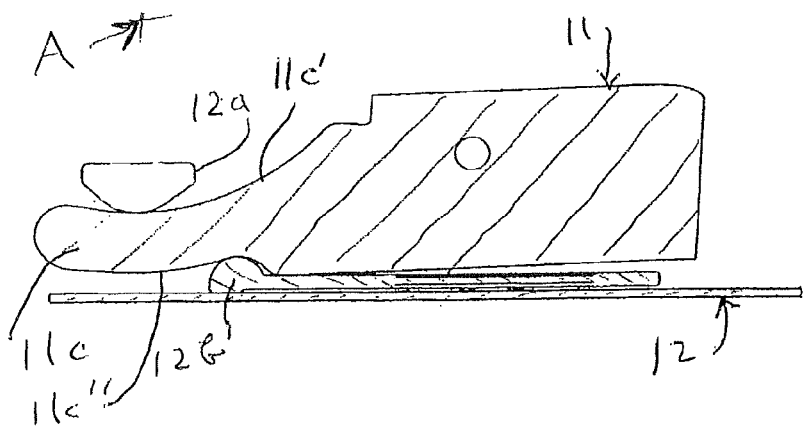
FIG. 7 is a cross sectional view of the rotation device taken along the section line VIII-VIII in FIG. 3 in the closed position of the bracket.
Figure 8:
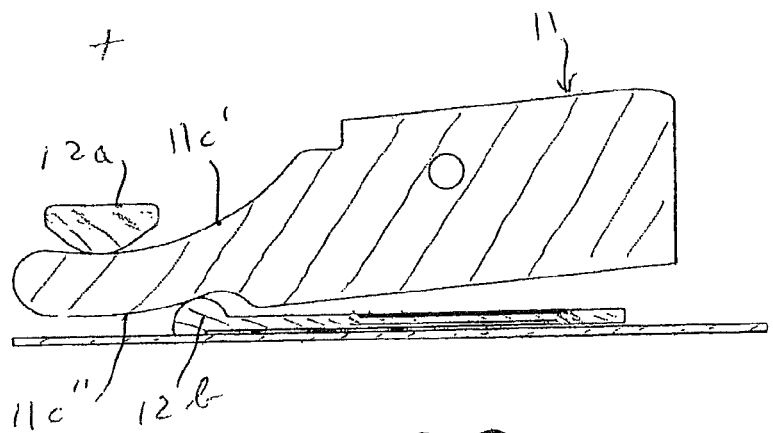
FIG. 8 is a cross sectional view of the rotation device taken along the section line VIII-VIII in FIG. 3 in the partially tilted position of the bracket.
Figure 9:
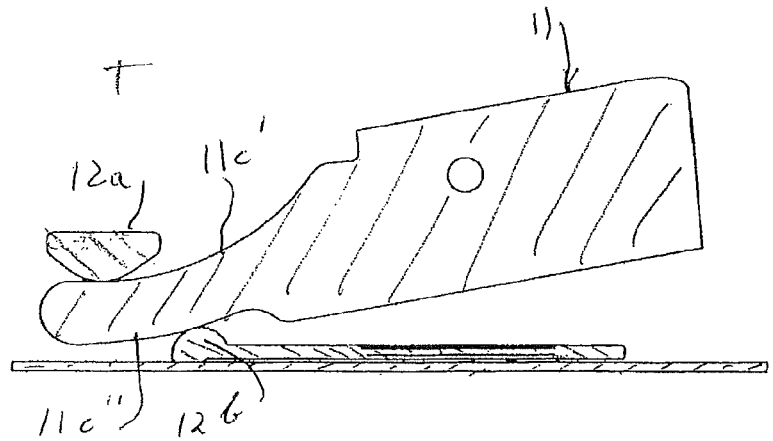
FIG. 9 is a cross sectional view of the rotation device taken along the section line VIII-VIII in FIG. 3 in the fully tilted position of the bracket.

FIGS. 4-6, respectively, and FIGS. 7-9, respectively show the three main rotated positions of the bracket 11, and thus of panel 3, namely, a closed covering position (FIGS. 4 and 7), a partially tilted covering position (FIGS. 5 and 8) and a fully tilted covering position (FIGS. 6 and 9).

Figure 2:
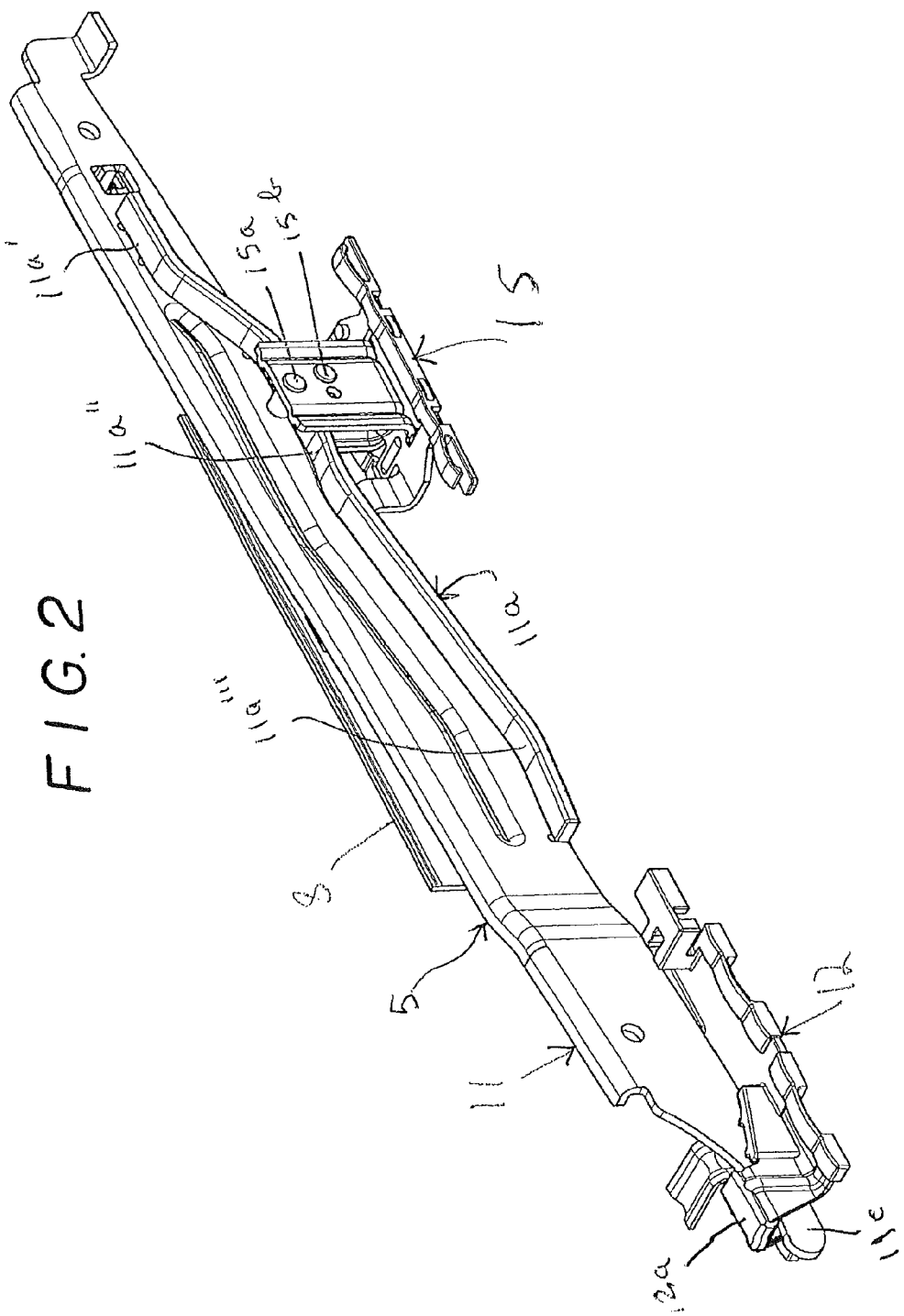
FIG. 2 shows an isometric view of the driving mechanism used in the vehicle sunroof device of FIG. 1.
Figure 3:
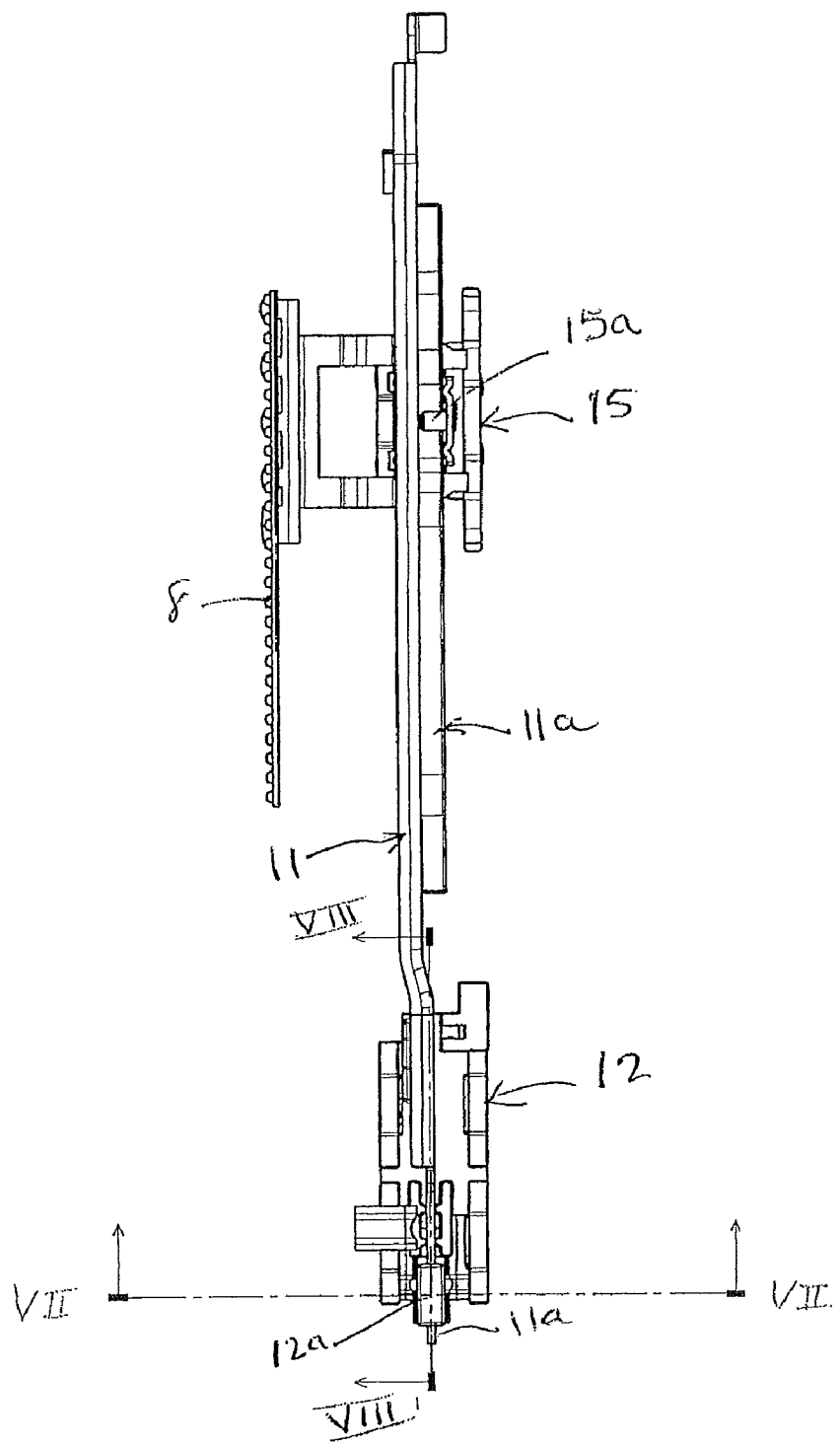
FIG. 3 shows a top plan view of the driving mechanism used in the vehicle sunroof device of FIG. 1.

FIGS. 2, 5 and 8 depict the partially tilted or partially vented position in which the drive shoe 15 has been driven slightly forward by the push/pull cable 8 from the panel's closed position. In so doing, the bearing pins 15a, 15b move out of engagement with the upper section 11a' of the fin 11a and into engagement with the intermediate section 11b". The bearing pins 15a, 15b thus impart an upward force to the rear part of the bracket, causing the bracket to tilt about a virtual pivot axis A (FIG. 7) created by contact between the upper and lower bearing surfaces 11c', 11c" on the arm 11c, and the respective supporting surfaces, 12a, 12b on the driven shoe 12. Further support for the pivoting is provided by engagement of the brackets guiding pin 11b within the curved slot 12c provided on the driven shoe 12.

FIGS. 6 and 9 represent the fully tilted positions of the bracket 11 and the panel 3 after the drive shoe 15 has moved further forwardly out of engagement with the intermediate section 11a" of the fin 11a and into engagement with the lower section 11a'''. Accordingly, the bearing pins 15a, 15b further pivot the rear end of the bracket 11 and the panel 3 upwardly about the virtual pivot axis A defined by the bearing elements 12a, 12b and the arm 11c.

By then operating the actuating device in a reverse direction to move the cable 18 and the drive shoe 15 in a rearward direction from the FIG. 6 position, the bearing pins 15a, 15b will impart a downward pivoting motion to the bracket 11 as they travel to the intermediate section 11a" and then to the upper section 11a' of the fin 11a. Accordingly, the bracket 11 and the panel 3 will be swung downwardly toward the closed position of FIG. 4.

When the panel 3 is in the closed position (FIG. 4), the panel 3 can be slid to the uncovering position by operating the activating device in a direction causing the bracket to move rearwardly (to the right in FIG. 4). The drive shoe will pull the bracket 11 and the driven shoe 12 rearwardly, along with the panel 3 in order to partially or completely uncover the opening 2, depending on how long the activating device 7 is operated.

The bearing surfaces 11c' and 11c" and the support surfaces 12a, 12b are preferably configured to define a virtual pivot axis that remains stationary during tilting. Alternatively, the configuration could be such that the virtual pivot axis moves vertically (up/down) during tilting, (i.e., an instantaneous pivot axis).

It will also be appreciated that the apparatus can include a checking mechanism (not shown) similar to that disclosed at 6, 60, 61 in U.S. Pat. No. 6,390,545 (whose disclosure is incorporated herein by reference) which prevents the bracket 11 and the panel 3 from being slid to an uncovering position while in either of the tilted venting positions, and also prevents the bracket and the panel from being tilted to a venting position while out of the covering position.

The creation of a virtual pivot axis means that the bracket 11 and the driven shoe 12 are not interconnected by a pin or other fastening means, so there is no physical axis about which the bracket 11 must rotate.

While there has been described a preferred embodiment of the improved damping mechanism, it will be appreciated that modifications and changes can be made by those skilled in the art without departing from the spirit of the improvements, and it is intended that the following claims cover such modifications and changes.

What is claimed is:

1. A vehicle sun roof device comprising: a panel for covering an opening in a roof of the vehicle, the panel including front and rear end sections, and being tiltable to raise the rear end section from a closed position to at least one venting position, and a drive system for tilting the panel comprising: a force-applying mechanism for tilting the panel by selectively applying an upward force or a downward force to the rear end section of the panel to raise or lower, respectively, the rear end section relative to the front end section, a support disposed on the roof adjacent the front end section of the panel and including an upwardly facing support surface and a downwardly facing support surface, a bracket fixed to the panel and extending in the front-to-rear direction of the vehicle, the bracket including an upwardly facing bearing surface and a downwardly facing bearing surface arranged to slidably engage the downwardly facing support surface and the upwardly facing support surface, respectively, for defining a virtual pivot axis for the panel as the panel tilts, a pin-and-slot connection between a first shoe and the bracket for guiding the bracket as it tilts, and wherein the location of the virtual pivot axis remains stationary as the panel tilts.

2. The device according to claim 1, wherein the upwardly facing bearing surface is of substantially cylindrical concave shape, and the downwardly facing bearing surface is of substantially cylindrical convex shape.

3. The device according to claim 1, wherein the upwardly and downwardly facing bearing surfaces of the bracket are formed on an arm projecting from a front end of the bracket.

4. The device according to claim 1, wherein the first shoe is arranged to remain stationary during tilting of the panel; the force-applying mechanism including a second shoe spaced horizontally from the first shoe and arranged to engage a follower structure disposed on the bracket and being movable horizontally relative to the first shoe for displacing said rear end section of the panel upwardly or downwardly.

5. The device according to claim 4, wherein the follower structure is defined by upper and lower surfaces of a fin extending lengthwise along the bracket and respectively engaging upper and lower guide pins of the movable shoe, the fin including vertically spaced sections for producing respective angles of tilt of the panel.

6. The device according to claim 4, wherein the drive system further includes an activating device and a push-pull cable connected to the second shoe.

7. The device according to claim 1, wherein the force-applying mechanism is operable to apply a force for moving the panel substantially horizontally to uncover the opening.

8. A vehicle sun roof device comprising: a panel movable substantially horizontally between a covering position for covering an opening in a roof of the vehicle and an uncovering position for uncovering the opening, the panel including front and rear end sections, and being tiltable in the covering position to raise the rear end section from a closed position to at least one venting position; and a drive system for tilting the panel comprising: an activating device mounted on the roof, a bracket affixed to the panel and extending in the front-to-rear direction of the vehicle, the bracket including, adjacent a front end thereof, an upwardly facing bearing surface of substantially cylindrical concave shape and a downwardly facing bearing surface of substantially cylindrical convex shape, a first shoe disposed adjacent the front end section of the bracket and including an upwardly facing support surface and a downwardly facing support surface for engaging, respectively, the downwardly facing bearing surface and the upwardly facing bearing surface for relative sliding movement therewith, and a second shoe disposed on the roof rearwardly of the first shoe and connected to the activating device by a push-pull cable to be movable thereby relative to the first shoe in a first horizontal direction for applying to a follower structure of the bracket an upward force for tilting the panel from the closed covering position about a virtual pivot axis defined by the upwardly and downwardly facing bearing surfaces and the downwardly and upwardly facing support surfaces, said second shoe being movable by the push-pull cable in a second horizontal direction when the panel is in the closed covering position, to move the panel from the closed covering position to the uncovering position, and a pin-and-slot connection between the first shoe and the bracket for guiding the bracket as it tilts, and wherein the location of the virtual pivot axis remains stationary as the panel tilts.

9. The device according to claim 8, wherein the follower structure of the bracket is defined by upper and lower surfaces of a fin extending lengthwise along the bracket and respectively engaging upper and lower guide pins of the second shoe, the fin including vertically spaced sections defining different angles of tilt of the panel.

10. The device according to claim 8, wherein the upwardly and downwardly facing bearing surfaces of the bracket are formed on an arm projecting forwardly from a front end of the bracket.

* * * * *